United States Patent
Washika et al.

(10) Patent No.: US 11,826,964 B2
(45) Date of Patent: Nov. 28, 2023

(54) METHOD OF BONDING THERMOPLASTIC RESIN AND METAL

(71) Applicant: HIROTEC CORPORATION, Hiroshima (JP)

(72) Inventors: Kiminori Washika, Hiroshima (JP); Tatsumi Kawafuchi, Hiroshima (JP)

(73) Assignee: HIROTEC CORPORATION, Hiroshima (JP)

( * ) Notice: Subject to any disclaimer, the term of this patent is extended or adjusted under 35 U.S.C. 154(b) by 10 days.

(21) Appl. No.: 17/924,053

(22) PCT Filed: Apr. 21, 2021

(86) PCT No.: PCT/JP2021/016120
§ 371 (c)(1),
(2) Date: Nov. 8, 2022

(87) PCT Pub. No.: WO2021/230025
PCT Pub. Date: Nov. 18, 2021

(65) Prior Publication Data
US 2023/0173763 A1 Jun. 8, 2023

(30) Foreign Application Priority Data

May 13, 2020 (JP) .................................. 2020-084660
Feb. 12, 2021 (JP) .................................. 2021-021122

(51) Int. Cl.
*B29C 65/16* (2006.01)
*B23K 26/324* (2014.01)
*B29C 65/00* (2006.01)

(52) U.S. Cl.
CPC ............ *B29C 65/16* (2013.01); *B23K 26/324* (2013.01); *B29C 66/71* (2013.01); *B29C 66/7422* (2013.01); *B29C 66/74281* (2013.01)

(58) Field of Classification Search
CPC ...... B23K 26/324; B23K 26/60; B29C 66/71; B29C 66/7422; B29C 66/74281
See application file for complete search history.

(56) References Cited

U.S. PATENT DOCUMENTS

2017/0095971 A1* 4/2017 Pullini .................... B29C 65/70
2017/0210058 A1 7/2017 Nishikawa et al.
(Continued)

FOREIGN PATENT DOCUMENTS

CN 106393705 A * 2/2017 ......... B29C 65/1635
JP 2005-104132 A 4/2005
(Continued)

OTHER PUBLICATIONS

International Search Report dated Jul. 20, 2021, issued in counterpart International Application No. PCT/JP2021/016120 (2 pages).

*Primary Examiner* — Daniel McNally
(74) *Attorney, Agent, or Firm* — WHDA, LLP

(57) ABSTRACT

The method of metal-thermoplastic resin direct bonding is characterized by comprising a first step for irradiating a surface of the metal material with a pulse laser under an oxidizing atmosphere to form a surface modification region, a second step for causing the thermoplastic resin material to abut against the surface modification region to form a bonding interface, and a third step for heating up the bonding interface by laser irradiation to achieve bonding, the first step including forming metal oxide particle clusters obtained when metal oxide particles having a particle diameter of 5-500 nm to be continuously bonded at the surface modification region, so that the maximum height (Sz) of a surface of the metal oxide particle clusters is 50 nm-3 μm.

14 Claims, 12 Drawing Sheets

(56) References Cited

U.S. PATENT DOCUMENTS

2017/0282469 A1   10/2017  Yamamura et al.
2020/0055258 A1*   2/2020  Hoult .................... B29C 66/939

FOREIGN PATENT DOCUMENTS

| JP | 2016-43561 A  | 4/2016 |
| JP | 2016-56363 A  | 4/2016 |
| JP | 2017-164986 A | 9/2017 |
| JP | 2019-123153 A | 7/2019 |

\* cited by examiner

METHOD OF BONDING THERMOPLASTIC RESIN AND METAL

TECHNICAL FIELD

The present invention relates to a method of bonding a thermoplastic resin material and a metal material, and more specifically, to a method of firmly and directly bonding a thermoplastic resin material and a metal material without using an adhesive or rivet fastening, or the like.

PRIOR ARTS

Conventionally, it is common to use an adhesive or rivet fastening for bonding a metal material and a resin material. When using an adhesive, bonding is achieved by physical adsorption force or chemical adsorption force, and when using rivet fastening, bonding is achieved by physical fastening with a rivet.

However, when using an adhesive, it is not suitable for precise bonding in which the bonding area is limited because the adhesive spreads wet, and in addition, there is a problem that the bonding strength greatly affects the state of the surface to be bonded (surface roughness, and the like). Furthermore, there are problems that the time required for curing the adhesive limits the productivity and it is difficult to maintain and manage the state of the adhesive.

Further, when using rivet fastening, since the parts become larger and heavier depending on the size and weight of the fastening portion and, in addition thereto, the degree of freedom in design is reduced, the applicable parts are limited.

Under such circumstances, a fluororesin is used very often in medical equipment, and related industries of foods and chemicals because of its excellent chemical resistance, abrasion resistance, flame retardancy, water repellency and oil repellency, and characteristic electrical properties such as low relative dielectric constant and low dielectric adherence, but since the molecular structure of the fluororesin is stable and inactive, it is extremely difficult to bond the fluororesin to each other and to other materials, and thus surface treatment is basically indispensable in order to obtain a good adhesive portion.

Further, general-purpose plastics such as polyethylene (PE), polypropylene (PP), polystyrene (PS), polyvinyl chloride (PVC), polyethylene terephthalate (PET) and ABS resin (ABS), engineering plastics and super engineering plastics are also available in large quantities in the field of various fields, and direct bonding between these thermoplastic resin materials and metal materials is also strongly desired. However, since these thermoplastic resins also have a stable molecular structure and are inactive, it is extremely difficult to directly bond the thermoplastic resin material to the metal material, and thus surface treatment is basically indispensable in order to obtain a good bonded portion.

At present, in the case of surface treatment by using metallic sodium, which is widely used in industrial applications, high adhesive strength can be expected by combining with an epoxy adhesive, but a clean alternative method is desired due to environmental problems. Further, since the adhesive has low heat resistance, it is difficult to continuously use it in a high temperature atmosphere where the characteristics of the thermoplastic resin are utilized, and thus it is limited to use at a relatively low temperature. Furthermore, the use of adhesives should be avoided as much as possible, especially in the fields of medicine and foods, and from this point of view, direct bonding without using adhesives is desired.

Under such circumstances, for example, in Patent Document 1 (Japanese Unexamined Patent Publication No. 2005-104132), there is proposed a method for bonding between fluororesin materials, which includes a step of roughening treatment of the surface of a first flat fluororesin material having laser transparency and the back surface of a second flat fluororesin material having laser transparency, a step of laminating the first flat fluororesin material and the second flat fluororesin material in the state where a liquid laser absorber is interposed between the rough surfaces, a step of melting the opposite surfaces of the first flat fluororesin material and the second flat fluororesin material by irradiating a laser beam L from surface side of the second flat fluororesin material to heat the laser absorber, and a step of fusing the melted fluororesin materials to each other.

In the method for bonding between the fluororesin materials described in Patent Document 1, it is said that the wettability is improved by previously forming the rough surface on at least one surface of each fluororesin material, and the liquid laser absorber spreads evenly on the surfaces of the fluororesin materials not to occur uneven welding, and thus the fluororesin materials can be stably bonded to each other by irradiating the laser beam.

Further, in Patent Document 2 (Japanese Unexamined Patent Publication No. 2016-56363), there is proposed a production method of a surface-modified molded body, a peroxide radical is introduced to a surface of a molded body by raising a surface temperature of the molded body including an organic polymer compound to (the melting point of the organic polymer compound—120) ° C. or more and performing atmospheric pressure plasma treatment on the surface of the molded body.

In the method for producing a surface-modified molded body described in Patent Document 2, it is said that by adjusting the temperature of the molded article surface at a high temperature around the melting point at the time of the atmospheric-pressure plasma treatment can improve the mobility of macromolecules of an organic polymer compound, can introduce peroxide radicals into the molded article surface, can generate carbon-carbon bonds among organic polymer molecules, and can accordingly improve the surface hardness, and thus, when bonding a molded body of an organic polymer compound having less adhesive property such as a fluororesin to a body to be bonded, bonding can be achieved even without the use of an adhesive, Furthermore, the present inventors also propose in Patent Document 3 (Japanese Unexamined Patent Publication No. 2019-123153) a bonding method of a fluororesin for directly bonding one material to be bonded and the other material to be bonded which includes a first step of applying laser irradiation to a surface to which a mixed solution is applied after applying the mixed solution containing sodium to a surface of the one material to be bonded where one of the materials to be bonded is a fluororesin, a second step of forming a boundary face to be bonded by bringing the other material to be bonded into contact with a surface to which the mixed solution is applied, and a third step of raising a temperature of the boundary face by laser irradiation.

In the bonding method of a fluororesin described in Patent Document 3, it is possible to improve the bonding ability of the fluororesin which has stable and inactive molecular structure by cleaving the C—F bond of the fluororesin by laser irradiation and bonding fluorine to sodium which has high bonding ability with fluorine.

CITATION LIST

Patent Document

Patent Document 1: Japanese Unexamined Patent Publication No. 2005-104132
Patent Document 2: Japanese Unexamined Patent Publication No. 2016-56363
Patent Document 3: Japanese Unexamined Patent Publication No. 2019-123153

SUMMARY OF THE INVENTION

Problem to be Solved by the Invention

However, the bonding method described in Patent Document 1 is intended for bonding the fluororesin materials to each other, and cannot bond the fluororesin material and the metal material. Further, the material to be bonded is limited to the fluororesin material having laser transparency, and the laser absorber that does not directly contribute to the improvement of the bonding interface strength remains at the bonding interface.

Further, in the method for producing a surface-modified molded product described in Patent Document 2, in addition to that it is necessary to dispose the thermoplastic resin material in a chamber having a vacuum exhaust system and perform the atmospheric pressure plasma treatment, it is necessary to raise the surface temperature of the thermoplastic resin material to the set temperature range. That is, the size and shape of the applicable thermoplastic resin material are limited, and the process becomes complicated. Furthermore, the body to be bonded which can be bonded to the thermoplastic resin material is limited to a material having a reactive functional group.

Furthermore, in the bonding method of fluororesin described in Patent Document 3, although a metal-fluororesin joint having higher strength than other bonding methods can be obtained, since the wet process where the mixed solution is applied to the surface of the material to be bonded is needed, there is room for improvement from the viewpoint of efficiently producing large quantities of homogeneous, high strength bonded portion. Further, although cleavage of the C—F bond of the fluororesin is indispensable for forming a good bonded portion, it is difficult to efficiently achieve sufficient cleavage only by the laser irradiation.

In view of the above problems in the prior art, an object of the present invention is to provide a simple method for directly bonding the thermoplastic resin materials together or directly bonding the thermoplastic resin material and the metal material without using an adhesive, rivet fastening, or the like, wherein the method of directly bonding the metal and the thermoplastic resin can be applied without restriction to the size and shape of the materials to be bonded, and makes it possible to efficiently produce large quantities of homogeneous, high strength bonded portion without including any wet steps.

Means for Solving the Problem

As a result of intensive research on the bonding method of the thermoplastic resin material and the metal material in order to achieve the above object, the present inventors have found that it is effective to form an appropriate surface modification region on the surface of the metal material by irradiation with a pulse laser, and reached the present invention.

Namely, the present invention provides a metal-thermoplastic resin direct bonding method where a metal material and a thermoplastic resin material are directly bonded, which includes:
a first step for irradiating a surface of the metal material with a pulse laser under an oxidizing atmosphere to form a surface modification region,
a second step for abutting the thermoplastic resin material against the surface modification region to form an interface to be bonded, and
a third step for heating up the interface to be bonded by laser irradiation to achieve bonding,
wherein, in the first step, a metal oxide particle cluster in which metal oxide particles having a particle size of 5 to 500 nm are continuously bonded is formed in the surface modification region, and
the maximum height (Sz) of the surface of the metal oxide particle cluster is 50 nm to 3 µm.

In the metal-thermoplastic resin direct bonding method of the present invention, the cleavage of the molecular bond of the thermoplastic resin material in the third step is promoted by the metal oxide particle cluster, and thereby a strong bonded portion can be efficiently obtained. Specifically, when the thermoplastic resin material is a fluororesin material, the cleavage of the C—F bond is promoted by the metal oxide particle cluster, and when the thermoplastic resin material is other than the fluororesin material, the cleavage of C—H bond, C—C bond, C=C bond, C—N bond and the like are promoted by the metal oxide particle cluster, and thereby strong bonded portion can be obtained. In addition, by setting the maximum height (Sz) of the surface of the metal oxide particle cluster, which is the interface to be bonded on the metal material side, to 50 nm to 3 µm, it is possible to ensure the adhesion between the metal oxide particle cluster and the thermoplastic resin material.

Since many fluororesins do not have melt fluidity, and when there are voids at the interface to be bonded, even if the voids are minute, the effect on adhesion is large. On the other hand, when the voids are filled with the fluororesin without gaps, the presence of the voids contributes to the improvement of the bonding strength. In the metal-fluororesin direct bonding method of the present invention, by setting the maximum height (Sz) of the surface of the metal oxide particle cluster to 50 nm or more, the strength of the bonded portion can be improved by filling with the fluororesin, and by setting the height to 3 µm or less, it is possible to prevent the fluororesin from remaining as voids without being filled.

Further, even when the thermoplastic resin is other than the fluororesin, by setting the maximum height (Sz) of the surface of the metal oxide particle cluster to 50 nm or more, the strength of the bonded portion is improved by filling with the thermoplastic resin, and by setting the height to 3 µm or less, it is possible to prevent the thermoplastic resin from remaining as voids without being filled.

Further, in the metal-thermoplastic resin direct bonding method of the present invention, since the surface of the metal material is irradiated with the pulse laser in the oxidizing atmosphere to form the surface modification region in the first step, it is not necessary to use a wet process for forming the surface modification region, and thus it is possible to efficiently form a large amount of a uniform surface modification region. In addition, since the laser equipment used in the first step may be used in the third step, it is possible to realize the improvement of work efficiency and the reduction of equipment introduction cost.

The laser used in the first step and the third step is not particularly limited as long as the effects of the present invention are not impaired, and various conventionally known lasers can be used, and for example, a semiconductor laser capable of efficiently heating the metal material can be preferably used.

Further, in the metal-thermoplastic resin direct bonding method of the present invention, it is preferable that the particle size of the metal oxide particles is 50 to 200 nm. By setting the particle size of the metal oxide particles to 50 nm or more, it becomes easy to set the maximum height (Sz) of the surface of the metal oxide particle cluster to 50 nm or more. Further, by setting the particle size of the metal oxide particles to 200 nm or less, it becomes easy to set the maximum height (Sz) of the surface of the metal oxide particle cluster to 3 μm or less. In addition, by setting the particle size of the metal oxide particles to 50 to 200 nm, when the thermoplastic resin material is heated on the surface of the metal oxide particles, it is possible to promote the cleavage of the C—F bond of the fluororesin material and the C—H bond, C—C bond, C=C bond, C—N bond and the like of the other thermoplastic resin material. The reason why these cleavages are promoted is not clear, but it is considered that the metal oxide particles having an appropriate curvature (energy state) exhibit so-called catalytic action.

Further, in the metal-thermoplastic resin direct bonding method of the present invention, when the thermoplastic resin is the fluororesin, it is preferable that in the third step, the C—F bond of the fluororesin material is cleaved by the catalytic action of the metal oxide particles to bond a functional group such as a carboxyl group yielded by the cleavage with a metal element contained in the metal material. Although the C—F bond of the fluororesin material is strong and is extremely difficult to be cleaved, it is possible to cleave the C—F bond efficiently by utilizing the catalytic action of the metal oxide particles. Further, by cleaving the C—F bond in the vicinity of the metal oxide particles, the carboxyl group and the like can be bonded to the metal element contained in the metal oxide particles. In the present invention, the bonding is accomplished by bonding the functional group such as carboxyl group derived from the fluororesin material to the metal element contained in the metal material, and the wording "metal element contained in the metal material" means, in the surface modification region, the metal element derived from the metal material contained in the metal oxide particles.

Further, when the thermoplastic resin is the resin other than the fluororesin, it is preferable that in the third step, the C—H bond and the like of the thermoplastic resin material is cleaved by the catalytic action of the metal oxide particles to bond a functional group such as a carboxyl group yielded by the cleavage with a metal element contained in the metal material. Although the C—H bond, C—C bond, C=C bond, C—N bond and the like of the thermoplastic resin material is strong and is extremely difficult to be cleaved, it is possible to achieve the cleavage by utilizing the catalytic action of the metal oxide particles. Further, by cleaving the C—H bond in the vicinity of the metal oxide particles, the carboxyl group and the like can be bonded to the metal element contained in the metal oxide particles. In the present invention, the bonding is accomplished by bonding the functional group such as carboxyl group derived from the thermoplastic resin material to the metal element contained in the metal material, and the wording "metal element contained in the metal material" means, in the surface modification region, the metal element derived from the metal material contained in the metal oxide particles, In the metal-thermoplastic resin direct bonding method of the present invention, it is preferable that an area of the surface modification region is 20% or more of the interface to be bonded. By setting the surface modification region to an area of 20% or more of the interface to be bonded, it is possible to ensure high joint strength and reliability for the entire bonded portion.

Further, in the metal-thermoplastic resin direct bonding method of the present invention, it is preferable that the irradiation energy of one pulse of the pulse laser used in the first step is 0.2 to 1.0 mj. By setting the irradiation energy of one pulse of the pulse laser to 0.2 to 1.0 mj, it is possible to form the metal oxide particle cluster where the metal oxide particles having a particle size of 5 to 500 nm are continuously bonded in the irradiation region, and at the same time, the maximum height (Sz) of the surface of the metal oxide particle cluster can be set to 50 nm to 3 μm.

Further, in the metal-thermoplastic resin direct bonding method of the present invention, when the thermoplastic resin is the fluororesin, it is preferable that a pressure of 5 MPa or more is applied to the interface to be bonded in the third step. By applying a pressure of 5 MPa or more to the interface to be bonded in the third step, the fluororesin material and the metal material (metal oxide particle cluster) can be adhered to each other, and a strong bonded portion can be obtained. In addition, even when bubbles or the like are formed at the bonded portion due to the temperature rise, the bubbles can be discharged to the outside of the system.

Further, in the metal-thermoplastic resin direct bonding method of the present invention, when the thermoplastic resin is the fluororesin, it is preferable that a pressure of more than 0 to 0.8 MPa or less is applied to the interface to be bonded in the third step. By applying a pressure to the interface to be bonded in the third step, the adhesion between the metal material and the thermoplastic resin material is improved, and thus the formation of defects can be suppressed, and the bonding strength at the bonding interface can be improved. On the other hand, by setting the applied pressure to 0.8 MPa or less, the formation of the skin layer and the bulk layer of the thermoplastic resin in the vicinity of the bonding interface can be suppressed, and the progress of breakage between the skin layer and the bulk layer can be suppressed.

More specifically, in general thermoplastic resins such as polypropylene (PP) and polyacetal (POM), since the strength of the main chain of the resin is not so high, due to the shape change caused by expansion and shrink of the thermoplastic resin during heat bonding, the breakage of the bond occurs between the skin layer and the bulk of the thermoplastic resin, which makes difficult to maintain the bonded body. On the other hand, a good bonded portion can be formed by applying an appropriate bonding pressure (pressure of 0.8 MPa or less) that does not cause internal breakage of the thermoplastic resin.

Here, it is preferable that the thermoplastic resin other than the fluororesin is any one of general purpose plastics, engineering plastics, and super engineering plastics. The kind of the thermoplastic resin material is not particularly limited as long as the effect of the present invention is not impaired, and various conventionally known thermoplastic resin materials can be used, and according to the metal-thermoplastic resin direct bonding method of the present invention, it is possible to obtain a good bonded body in which these plastic materials and metal materials are directly bonded.

In the metal-thermoplastic resin direct bonding method of the present invention, when the thermoplastic resin is other than the fluororesin, it is preferable that the temperature (T) of the interface to be bonded in the third step satisfies the relational Equation (1): the melting point (° C.) of the thermoplastic resin material≤T≤the thermal decomposition temperature of the thermoplastic resin material. By setting the temperature (T) of the interface to be bonded of the thermoplastic resin material in the third step to be equal to or higher than the melting point (° C.) of the thermoplastic resin material, the surface modification region formed on the surface of the metal material and the thermoplastic resin material are close contact with each other, and the cleavage of C—H bond, C—C bond, C═C bond, C—N bond and the like of the thermoplastic resin material are promoted by the metal oxide particle cluster, and thereby strong bonded portion can be obtained efficiently. On the other hand, by setting the temperature (T) of the interface to be bonded to be equal to or lower than the thermal decomposition temperature of the thermoplastic resin material, it is possible to suppress the decrease in strength of the thermoplastic resin material due to excessive heat input. That is, according to the metal-thermoplastic resin direct bonding method of the present invention, since the cleavage of C—H bond, C—C bond, C═C bond, C—N bond and the like of the thermoplastic resin material can be promoted by the metal oxide particle cluster, even if the bonding temperature is set to be equal to or lower than the thermal decomposition temperature of the thermoplastic resin material, a good bonded portion can be formed.

Here, for example, when polypropylene is used as the thermoplastic resin material, since the melting point of polypropylene is 160° C. and the thermal decomposition temperature is 387° C., it is preferable to set the temperature of the interface to be bonded in the third step to 160 to 387° C. Further, when polyethylene is used as the thermoplastic resin material, since the melting point of polyethylene is 125° C. and the thermal decomposition temperature is 406° C., it is preferable to set the temperature of the interface to be bonded in the third step to 125 to 406° C.

Further, in the metal-thermoplastic resin direct bonding method of the present invention, when the thermoplastic resin is other than the fluororesin, it is preferable that the third step is achieved in a state where the metal material and the interface to be bonded of the thermoplastic resin material are in close contact with each other, and after the third step, the close contact state is maintained until the temperature of the bonded interface becomes 80% or less of the melting point (° C.) of the thermoplastic resin material. In order to prevent changes in the position and shape of the material to be bonded during the bonding process, it is preferable that the positions of the metal material and the thermoplastic resin material are restrained by using an appropriate jig in the third step, but when the temperature of the bonded interface is equal to or higher than the melting point and near the melting point of the thermoplastic resin material, the state of the bonded interface is unstable, and thus sufficient bonding strength cannot be obtained if the restraint is removed in this state. On the other hand, by maintaining the restraint until the temperature of the bonded interface becomes 80% or less of the melting point (° C.) of the thermoplastic resin material, a stable and high-strength bonded interface can be obtained. Here, when polypropylene is used as the thermoplastic resin material, since the melting point of polypropylene is 160° C., it is preferable to maintain the restraint state until the temperature of the bonded interface becomes 128° C. (about 130° C.) or less.

Further, in the metal-thermoplastic resin direct bonding method of the present invention, in the third step, it is preferable that when the thermoplastic resin material is transparent, the pulse laser is irradiated from the thermoplastic resin material side, and when the thermoplastic resin material is opaque, the pulse laser is irradiated from the metal material side. When the thermoplastic resin material is transparent, by irradiating the pulse laser from the thermoplastic resin material side, and when the thermoplastic resin material is opaque, by irradiating the pulse laser from the metal material side, the temperature of the interface to be bonded can be raised efficiently. Further, by irradiating the laser from the metal material side, it is possible to use any material as the material to be bonded regardless of the kind of the thermoplastic resin material. Furthermore, by heating from the metal material side, it is possible to provide a space on the thermoplastic resin material side, and if necessary, pressure can be applied from the surface of the thermoplastic resin material.

Furthermore, in the metal-thermoplastic resin direct bonding method of the present invention, it is preferable that the metal material is any one of a steel material, an aluminum material, an aluminum alloy material, a titanium material, a titanium alloy material, a nickel-titanium alloy material, a copper material and a copper alloy material. The kind of the metal material is not particularly limited as long as the effect of the present invention is not impaired, and various conventionally known metal materials can be used, and when the metal material is any one of a steel material, an aluminum material, an aluminum alloy material, a titanium material, or a titanium alloy material, a nickel-titanium alloy material, a copper material and a copper alloy material, by irradiating the pulse laser under the oxidizing atmosphere, it is possible to form easily the metal oxide particle cluster where the metal oxide particles having a particle size of 5 to 500 nm are continuously bonded, and in addition, the maximum height (Sz) of the surface of the metal oxide particle cluster can be set to 50 nm to 3 μm. The steel material also includes a general-purpose covering material such as a stainless steel material and a galvanized steel sheet.

Further, the aluminum material, the aluminum alloy material, the titanium material and the titanium alloy material have high specific strength, and the bonded body with the thermoplastic resin material can be suitably used for applications requiring light weight and high strength. Further, the steel material is the most widely used metal material, and the bonded body with the thermoplastic resin material can be used for a wide variety of applications. Further, since the stainless steel material has excellent corrosion resistance, by combining a thermoplastic resin material (particularly fluororesin material) with a stainless steel material, it is possible to suitably utilize in related industries such as medical devices, foods and chemicals.

Effect of the Invention

According to the method for bonding the thermoplastic resin and the metal of the present invention, it is possible to provide a simple method for directly bonding the thermoplastic resin materials together or directly bonding the thermoplastic resin material and the metal material without using an adhesive, rivet fastening, or the like, wherein the method of directly bonding the metal and the thermoplastic resin can be applied without restriction to the size and shape of the materials to be bonded, and makes it possible to efficiently produce large quantities of homogeneous, high strength bonded portion without including any wet steps.

EMBODIMENTS FOR ACHIEVING THE INVENTION

In the following, by referring the drawings, as the typical embodiments of the method for bonding the thermoplastic resin and the metal of the present invention, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

Figure 1:
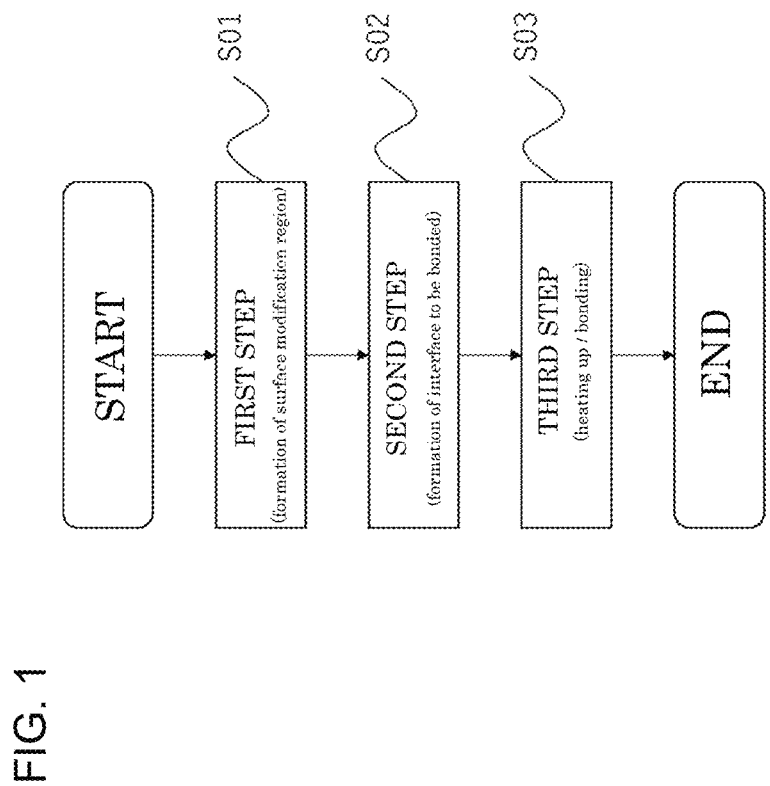
FIG. 1 is a process diagram of the metal-fluororesin direct bonding method of the present invention.

1. Case that the Thermoplastic Resin is Fluororesin
(1) Bonding Method of Fluororesin and Metal FIG. 1 is a process diagram of the metal-fluororesin direct bonding method of the present invention. The metal-fluororesin direct bonding method of the present invention includes a first step (S01) of forming the surface modification region on the metal material, the second step (S02) of forming the interface to be bonded, and the third step (S03) of achieving the bonding by raising the temperature of the interface to be bonded. In the following, each step will be described in detail.

(1-1) First Step (S01: Surface Modification Region Forming Step)

The first step (801) is a step for obtaining the surface modification region that contributes to the formation of a strong bonded interface. In the surface modification region, the metal oxide particle cluster in which metal oxide particles having a particle size of 5 to 500 nm are continuously bonded and which is the metal oxide particle cluster having the maximum height (Sz) of 50 nm to 3 un is formed.

By setting the maximum height (Sz) of the surface of the metal oxide particle cluster, which is the interface to be bonded on the metal material side, to 50 nm to 3 μm, it is possible to ensure the adhesion between the metal oxide particle cluster and the fluororesin material in the third step (S03). By setting the maximum height (Sz) of the surface of the metal oxide particle cluster to 50 nm or more, the strength of the bonded portion is improved by filling with the fluororesin, and by setting the height to 3 μm or less, it is possible to prevent the fluororesin from remaining as voids without being filled. More preferable maximum surface height (Sz) of the metal oxide particle cluster is 100 nm to 2 μm, and the most preferable maximum height (Sz) is 200 nm to 1 μm.

Further, it is preferable that the particle size of the metal oxide particles is 50 to 200 nm. By setting the particle size of the metal oxide particles to 50 nm or more, it becomes easy to set the maximum height (Sz) of the surface of the metal oxide particle cluster to 50 nm or more. Further, by setting the particle size of the metal oxide particles to 200 nm or less, it becomes easy to set the maximum height (Sz) of the surface of the metal oxide particle cluster to 3 μm or less. In addition, by setting the particle size of the metal oxide particles to 50 to 200 nm, when the fluororesin material is heated on the surface of the metal oxide particles, it is possible to promote the cleavage of the C—F bond of the fluororesin material.

In the first step (S01), specifically, the pulse laser is irradiated to the surface of the metal material under the oxidizing atmosphere. The laser used in the first step is not particularly limited as long as the effects of the present invention are not impaired, and various conventionally known lasers can be used, and for example, a semiconductor laser capable of efficiently heating the metal material can be preferably used.

It is preferable that the irradiation energy of one pulse of the pulse laser is 0.2 to 1.0 mj. By setting the irradiation energy of one pulse of the pulse laser to 0.2 to 1.0 mj, it is possible to form the metal oxide particle cluster where the metal oxide particles having a particle size of 5 to 500 nm are continuously bonded in the irradiation region, and at the same time, the maximum height (Sz) of the surface of the metal oxide particle cluster can be set to 50 nm to 3 μm.

The kind of the oxidizing atmosphere is not particularly limited as long as the effect of the present invention is not impaired, and the atmosphere may be an atmosphere where the metal oxide particle cluster is formed on the surface of the metal material by irradiation with the pulse laser, and for example, the treatment should be performed in the atmosphere.

Further, the surface modification region may be formed at the interface to be bonded of the metal material, but it is preferable that an area of the surface modification region is 20% or more of the interface to be bonded. By setting the surface modification region to an area of 20% or more of the interface to be bonded, it is possible to ensure high joint strength and reliability for the entire bonded portion. Further, the surface modification region may be formed in a planar shape, and for example, an appropriate pattern may be drawn as a linear shape or the like.

(1-2) Second Step (S02: Interface Forming Interface to be Bonded)

The second step (S02) is a step for forming the interface to be bonded, by abutting the metal material in which the surface modification region was formed in the first step (S01) with the fluororesin material.

Here, the shape of abutting the metal material and the fluororesin material, the flat shaped materials may be abutted with each other in a general superposed joint state, or for example, the end face of the metal material is abutted with the surface of the fluororesin material to form so-called T-shape joint.

Further, when the metal material and the fluororesin material are put into the superposed joint state, by abutting the heat-resistant glass plate or the like with the surface of either one or both of the materials to be bonded and restraining the entire surface, it is possible to bring into closer contact with each other, and deviation of the interface to be bonded during the laser irradiation can be suppressed. It is preferable to use heat-resistant glass having excellent laser transparency.

The fluororesin used as the material to be bonded is not particularly limited as long as the effects of the present invention are not impaired, and conventionally known fluororesins can be used. Examples of the fluororesin include polytetrafluoroethylene (PTFE, melting point: 327° C.), polychlorotrifluoroethylene (PCTFE, melting point: 220° C.), polyvinylidene fluoride (PVDF, melting point: 151 to 178° C.), and the like. polypolyfluoride (PVF, melting point: 203° C.), tetrafluoroethylene-hexafluoropropylene copolymer (FEP, melting point: 250 to 275° C.), tetrafluoroethylene-perfluoroalkyl vinyl ether copolymer (PFA, melting point: 302 to 310° C.), tetrafluoroethylene-ethylene copolymer (ETFE, melting point: 218 to 270° C.), tetrafluoroethylene-perfluorodioxol copolymer (TFE/PDD), chlorotrifluoroethylene-ethylene copolymer (ECTFE, melting point: 245° C.) and the like, and since the bonding method of the fluororesin of the present invention can give a bonded portion having excellent high temperature strength without using an adhesive, it is preferable to use polytetrafluoroethylene (PTFE, melting point: 327° C.) having a high melting point.

The metal material used as the material to be bonded is not particularly limited as long as the effect of the present invention is not impaired, and various conventionally known metal materials can be used, and for example, stainless steel, titanium, titanium alloy, aluminum, aluminum alloy, magnesium, magnesium alloy, copper, copper alloy and the like can be used, and from the viewpoint of specific strength, it is preferable to use aluminum, aluminum alloy, titanium and titanium alloy, and from the viewpoint of corrosion resistance and the like, it is preferable to use stainless steel, titanium and titanium alloy.

(1-3) Third Step (S03: Temperature Raising Step)

The third step (S03) is a step for heating up the interface to be bonded which is formed in the second step (S02) by laser irradiation to achieve bonding.

Further, in the third step (S03), it is preferable that when the fluororesin material is transparent, the pulse laser is irradiated from the fluororesin material side, and when the fluororesin material is opaque, the pulse laser is irradiated from the metal material side. When the fluororesin material is transparent, by irradiating the pulse laser from the fluororesin material side, and when the fluororesin material is opaque, by irradiating the pulse laser from the metal material side, the temperature of the interface to be bonded can be raised efficiently. Further, by irradiating the laser from the metal material side, it is possible to use any material as the material to be bonded regardless of the kind of the fluororesin material. Furthermore, by heating from the metal material side, it is possible to provide a space on the fluororesin material side, and if necessary, pressure can be applied from the surface of the fluororesin resin material.

In the third step (S03), it is preferable that a pressure of 5 MPa or more is applied to the interface to be bonded. By applying a pressure of 5 MPa or more to the interface to be bonded, the fluororesin material and the metal material (metal oxide particle cluster) can be adhered to each other, and a strong bonded portion can be obtained. In addition, even when bubbles or the like are formed at the bonded portion due to the temperature rise, the bubbles can be discharged to the outside of the system.

The bonded portion obtained by the metal-fluororesin direct bonding method of the present invention has sufficiently high strength, and the variation in quality can be reduced by adding a pressuring step. By applying the pressure, for example, since the softened fluororesin material spreads beyond the range of the heat affected zone of the metal material, the bonded interface between the metal material and the fluororesin material can be expanded.

When applying the pressure to the interface to be bonded, in the second step (S02), by abutting the heat-resistant glass plate or the like with the surface of either one or both of the materials to be bonded and restraining the entire surface, it is possible to apply the pressure to the interface to be bonded easier.

The process parameters related to the laser irradiation such as laser output, scanning speed, and focal length may be appropriately selected according to the kind and size of the material to be bonded, the area of the interface to be bonded, the mechanical properties required for the joint, and the like.

(2) Metal-Resin Bonded Body

Figure 2:
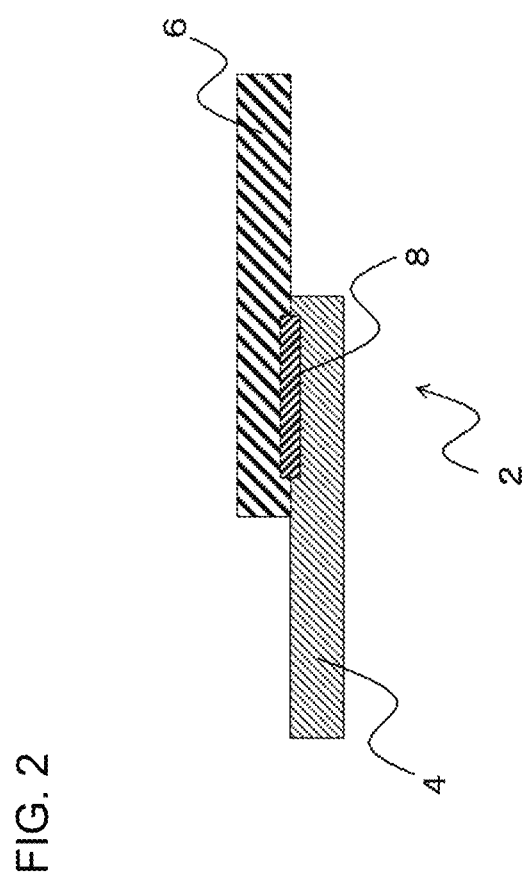
FIG. 2 is a schematic cross-sectional view which shows an example of the bonded body obtained by the metal-thermoplastic resin direct bonding method of this invention (when the thermoplastic resin is the fluororesin).

FIG. 2 is a schematic cross-sectional view which shows an example of a joint obtained by the metal-fluororesin direct bonding method of the present invention. The metal-fluororesin bonded body 2 is a superimposed bonded member of the fluororesin material 4 and the metal material 6, and the fluororesin material 4 and the metal material 6 are directly bonded to each other. The metal-resin bonded body 2 is one where the fluororesin material 4 and the metal material 6 are directly bonded to each other, and no adhesive, rivet, or the like is used in the bonded portion 8. The metal-resin bonded body 2 can be suitably manufactured by the above-mentioned method for bonding the fluororesin of the present invention.

In the metal-fluororesin bonded body 2, the fluororesin material 4 and the metal material 6 are firmly bonded to each other, and when the fluororesin material 4 and the metal material 6 are forcibly peeled off, by the TEM observation or high-magnification SEM observation, the fluororesin material 4 elongated in a fibrous form can be observed at the bonded interface. Further, when a shear tensile test is performed on the metal-fluororesin bonded body 2, the bonded body exhibits excellent tensile properties to the extent that the fluororesin material 4 is elongated.

Further, at the bonded interface, the C—F bond of the fluororesin material 4 is converted to bonds of C—O—O, C—O, C=O, and the like. As a result, for example, when the above-mentioned fluororesin material 4 elongated in a fibrous form is elementally analyzed, the detected amount of F is extremely small as compared with C and O.

2. Case that the Thermoplastic Resin is Other than the Fluororesin (1) Bonding Method of Thermoplastic Resin and Metal Even if the thermoplastic resin is other than the fluororesin, a good bonded portion can be obtained by following the process diagram shown in FIG. 1. In the following, each step will be described in detail.

(1-1) First Step (S01): Surface Modification Region Forming Step)

The first step (S01) is a step for obtaining the surface modification region that contributes to the formation of a strong bonded interface. In the surface modification region, the metal oxide particle cluster in which metal oxide particles having a particle size of 5 to 500 nm are continuously bonded and which is the metal oxide particle cluster having the maximum height (Sz) of 50 nm to 3 μm is formed.

By setting the maximum height (Sz) of the surface of the metal oxide particle cluster, which is the interface to be bonded on the metal material side, to 50 nm to 3 μm, it is possible to ensure the adhesion between the metal oxide particle cluster and the thermoplastic resin material in the third step (S03). By setting the maximum height (Sz) of the surface of the metal oxide particle cluster to 50 nm or more, the strength of the bonded portion is improved by filling with the thermoplastic resin, and by setting the height to 3 μm or less, it is possible to prevent the thermoplastic resin from remaining as voids without being filled. More preferable maximum surface height (Sz) of the metal oxide particle cluster is 100 nm to 2 μm, and the most preferable maximum height (Sz) is 200 nm to 1 μm.

Further, it is preferable that the particle size of the metal oxide particles is 50 to 200 nm. By setting the particle size of the metal oxide particles to 50 nm or more, it becomes easy to set the maximum height (Sz) of the surface of the metal oxide particle cluster to 50 nm or more. Further, by setting the particle size of the metal oxide particles to 200 nm or less, it becomes easy to set the maximum height (Sz) of the surface of the metal oxide particle cluster to 3 1μm or less. In addition, by setting the particle size of the metal oxide particles to 50 to 200 nm, when the thermoplastic resin material is heated on the surface of the metal oxide particles, it is possible to promote the cleavage of the C—H bond and the like of the thermoplastic resin material.

In the first step (801), specifically, the pulse laser is irradiated to the surface of the metal material under the oxidizing atmosphere. The laser used in the first step is not particularly limited as long as the effects of the present invention are not impaired, and various conventionally known lasers can be used, and for example, a semiconductor laser capable of efficiently heating the metal material can be preferably used.

It is preferable that the irradiation energy of one pulse of the pulse laser is 0.2 to 1.0 mj. By setting the irradiation energy of one pulse of the pulse laser to 0.2 to 1.0 mj, it is possible to form the metal oxide particle cluster where the metal oxide particles having a particle size of 5 to 500 nm are continuously bonded in the irradiation region, and at the same time, the maximum height (Sz) of the surface of the metal oxide particle cluster can be set to 50 nm to 3 μm.

The kind of the oxidizing atmosphere is not particularly limited as long as the effect of the present invention is not impaired, and the atmosphere may be an atmosphere where the metal oxide particle cluster is formed on the surface of the metal material by irradiation with the pulse laser, and for example, the treatment should be performed in the atmosphere.

Further, the surface modification region may be formed at the interface to be bonded of the metal material, but it is preferable that an area of the surface modification region is 20% or more of the interface to be bonded. By setting the surface modification region to an area of 20% or more of the interface to be bonded, it is possible to ensure high joint strength and reliability for the entire bonded portion. Further, the surface modification region may be formed in a planar shape, and for example, an appropriate pattern may be drawn as a linear shape or the like.

(1-2) Second Step (802: Interface Forming Interface to be Bonded)

The second step (802) is a step for forming the interface to be bonded, by abutting the metal material in which the surface modification region was formed in the first step (S01) with the thermoplastic resin material.

Here, the shape of abutting the metal material and the thermoplastic resin material, the flat shaped materials may be abutted with each other in a general superposed joint state, or for example, the end face of the metal material is abutted with the surface of the thermoplastic resin material to form so-called T-shape joint.

Further, when the metal material and the thermoplastic resin material are put into the superposed joint state, by abutting the heat-resistant glass plate or the like with the surface of either one or both of the materials to be bonded and restraining the entire surface, it is possible to bring into closer contact with each other, and deviation of the interface to be bonded during the laser irradiation can be suppressed. It is preferable to use heat-resistant glass having excellent laser transparency.

Further, in order to prevent the position change of the material to be bonded in the third step, it is preferable to restrain the positions of the metal material and the thermoplastic resin material by using an appropriate jig (the interface to be bonded is brought into close contact). Here, the jig to be used is not particularly limited, and various conventionally known jigs can be used.

The thermoplastic resin used as the material to be bonded is not particularly limited as long as the effects of the present invention are not impaired, and conventionally known general-purpose plastics, engineering plastics and super engineering plastics can be preferably used. More specifically, for example, polyethylene (PE), polypropylene (PP), polystyrene (PS), polyacetal (POM), polyvinyl chloride (PVC), polyethylene terephthalate (PET), ABS resin (ABS), polyamide (PA), polycarbonate (PC), PET (polyethylene terephthalate), and various carbon fiber reinforced plastics (CFRP), glass fiber reinforced plastics (GFRP), and the like can be used.

The metal material used as the material to be bonded is not particularly limited as long as the effect of the present invention is not impaired, and various conventionally known metal materials can be used, and for example, any one of a steel material, an aluminum material, an aluminum alloy material, a titanium material, a titanium alloy material, a nickel-titanium alloy material, a copper material and a copper alloy material can be used, and from the viewpoint of specific strength, it is preferable to use aluminum, aluminum alloy, titanium and titanium alloy, and from the viewpoint of corrosion resistance and the like, it is preferable to use stainless steel, titanium and titanium alloy, and from the viewpoint of material cost, it is preferable to use various carbon steels including a galvanized steel sheet.

(1-3) Third Step (S03: Temperature Raising Step)

The third step (S03) is a step for heating up the interface to be bonded which is formed in the second step (S02) by laser irradiation to achieve bonding.

Further, in the third step (S03), it is preferable that when the thermoplastic resin material is transparent, the pulse laser is irradiated from the thermoplastic resin material side, and when the thermoplastic resin material is opaque, the pulse laser is irradiated from the metal material side. When the thermoplastic resin material is transparent, by irradiating the pulse laser from the thermoplastic resin material side, and when the thermoplastic resin material is opaque, by irradiating the pulse laser from the metal material side, the temperature of the interface to be bonded can be raised efficiently. Further, by irradiating the laser from the metal material side, it is possible to use any material as the material to be bonded regardless of the kind of the thermoplastic resin material. Furthermore, by heating from the metal material side, it is possible to provide a space on the thermoplastic resin material side, and if necessary, pressure can be applied from the surface of the thermoplastic resin material.

It is preferable that the temperature (T) of the interface to be bonded in the third step (S03) satisfies the relational Equation (1): the melting point (° C.) of the thermoplastic resin material≤T≤the thermal decomposition temperature of the thermoplastic resin material. By setting the temperature (T) of the interface to be bonded to be equal to or higher than the melting point (° C.) of the thermoplastic resin material, the surface modification region formed on the surface of the metal material and the thermoplastic resin material are close contact with each other, and the cleavage of C—H bond and the like of the thermoplastic resin material are promoted by the metal oxide particle cluster, and thereby strong bonded portion can be obtained efficiently. On the other hand, by setting the temperature (T) of the interface to be bonded to be equal to or lower than the thermal decomposition temperature of the thermoplastic resin material, it is possible to suppress the decrease in strength of the thermoplastic resin material due to excessive heat input. Here, the temperature (T) of the interface to be bonded can be measured, for example, by attaching a K-type thermocouple to the center of the interface to be bonded on the metal material side.

Further, it is preferable that a pressure of more than 0 to 0.8 MPa or less is applied to the interface to be bonded in the third step (S03). By applying a pressure to the interface to be bonded, the adhesion between the metal material and the thermoplastic resin material is improved, and thus the formation of defects can be suppressed, and the bonding strength at the bonding interface can be improved. On the other hand, by setting the applied pressure to 0.8 MPa or less, the formation of the skin layer and the bulk layer of the thermoplastic resin in the vicinity of the bonding interface can be suppressed, and the progress of breakage between the skin layer and the bulk layer can be suppressed. Here, the pressure applied to the interface to be bonded can be measured, for example, by arranging a heat-resistant pressure-sensitive sheet at the portion to be bonded.

The bonded portion obtained by the metal-thermoplastic resin direct bonding method of the present invention has sufficiently high strength, and the variation in quality can be reduced by adding a pressuring step. By applying the pressure, for example, since the softened thermoplastic resin material spreads beyond the range of the heat affected zone of the metal material, the bonded interface between the metal material and the thermoplastic resin material can be expanded.

When applying the pressure to the interface to be bonded, in the second step (S02), by abutting the heat-resistant glass plate or the like with the surface of either one or both of the materials to be bonded and restraining the entire surface, it is possible to apply the pressure to the interface to be bonded easier.

Further, it is preferable that the third step (S03) is achieved in a state where the metal material and the interface to be bonded of the thermoplastic resin material are in close contact with each other, and after the third step (S03), the close contact state is maintained until the temperature of the bonded interface becomes 80% or less of the melting point (° C.) of the thermoplastic resin material. In order to maintain the close contact of the interface to be bonded during the bonding process, it is preferable that the positions of the metal material and the thermoplastic resin material are restrained by using an appropriate jig in the third step (S03), but when the temperature of the bonded interface is equal to or higher than the melting point and near the melting point of the thermoplastic resin material, the state of the bonded interface is unstable, and thus sufficient bonding strength cannot be obtained if the restraint is removed in this state. On the other hand, by maintaining the restraint until the temperature of the bonded interface becomes 80% or less of the melting point (° C.) of the thermoplastic resin material, a stable and high-strength bonded interface can be obtained.

The process parameters related to the laser irradiation such as laser output, scanning speed, and focal length may be appropriately selected according to the kind and size of the material to be bonded, the area of the interface to be bonded, the mechanical properties required for the joint, and the like.

(2) Metal-Resin Bonded Body

Figure 3:
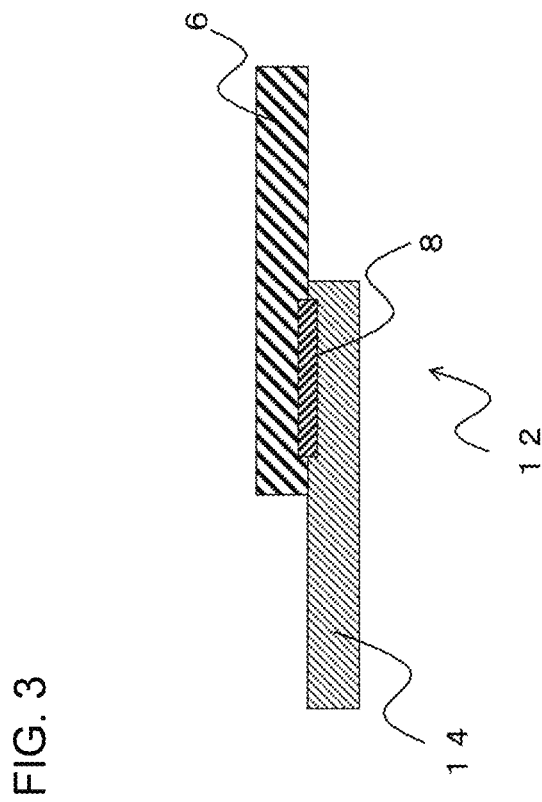
FIG. 3 is a schematic cross-sectional view which shows an example of the bonded body obtained by the metal-thermoplastic resin direct bonding method of this invention (when the thermoplastic resin is other than the fluororesin).

FIG. 3 is a schematic cross-sectional view which shows an example of a joint obtained by the metal-thermoplastic resin direct bonding method of the present invention. The metal-thermoplastic resin bonded body 12 is a superimposed bonded member of the thermoplastic resin material 14 and the metal material 6, and the thermoplastic resin material 14 and the metal material 6 are directly bonded to each other. The metal-resin bonded body 12 is one where the thermoplastic resin material 14 and the metal material 6 are directly bonded to each other, and no adhesive, rivet, or the like is used in the bonded portion 8. The metal-resin bonded body 12 can be suitably manufactured by the above-mentioned method for bonding the thermoplastic resin of the present invention.

In the metal-thermoplastic resin bonded body 12, the thermoplastic resin material 14 and the metal material 6 are firmly bonded to each other, and when the thermoplastic resin material 14 and the metal material 6 are forcibly peeled off, by the TEM observation or high-magnification SEM observation, the thermoplastic resin material 14 elongated in a fibrous form can be observed at the bonded interface. Further, when a shear tensile test is performed on the metal-thermoplastic resin bonded body 12, the bonded body exhibits excellent tensile properties to the extent that the thermoplastic resin material 14 is elongated.

Further, when an appropriate tensile test is performed on the metal-thermoplastic resin bonded body 12, since the thermoplastic resin material 14 and the metal material 6 are firmly bonded to each other, elongation and breakage of the thermoplastic resin material 14 are observed. The tensile test is preferably performed based on ISO19095, which is an international standard for a resin-metal bonding property evaluation test method. In the tests according to the previous standards, it difficult to quantify the bonding characteristics because the resin part weaker than the bonded portion is broken first, but in ISO19095, by optimizing the shape of the test piece and using an auxiliary jig, since the resin portion can be prevented from being broken, the strength of the bonded interface can be measured.

Although the typical embodiments of the present invention have been described above, the present invention is not limited to these, and various design changes are possible, and all of these design changes are included in the technical scope of the present invention.

EXAMPLE

1. Case that the Thermoplastic Resin is Fluororesin

Example 1

The fluororesin material and the stainless steel material were directly bonded by using the metal-fluororesin direct bonding method of the present invention. The fluororesin material is polytetrafluoroethylene (PTFE), which was Naflon TOMBO No. 9000 (plate thickness 1 mm) available from Nichias Corporation, and was cut into 25 mm×50 mm to obtain one material to be bonded. The metal material was SUS304 stainless steel (plate thickness 0.5 mm), and was cut into 25 mm×100 mm to obtain the other material to be bonded.

A laser was irradiated to the region which is to be the interface to be bonded of the stainless steel material in the atmosphere to form a surface modification region (first step). A YLP pulse laser available from IPG Corporation was used as the laser, and the irradiation conditions of the laser were an average output: 50 W (energy of 1 pulse: 1 mj), a focus diameter: 59 µm, and a scanning speed: 15000588.5 µm/s. Further, the pitch and offset of the laser irradiation were both set to 60 µm, and the surface modification region was formed over the entire interface to be bonded.

Figure 4:
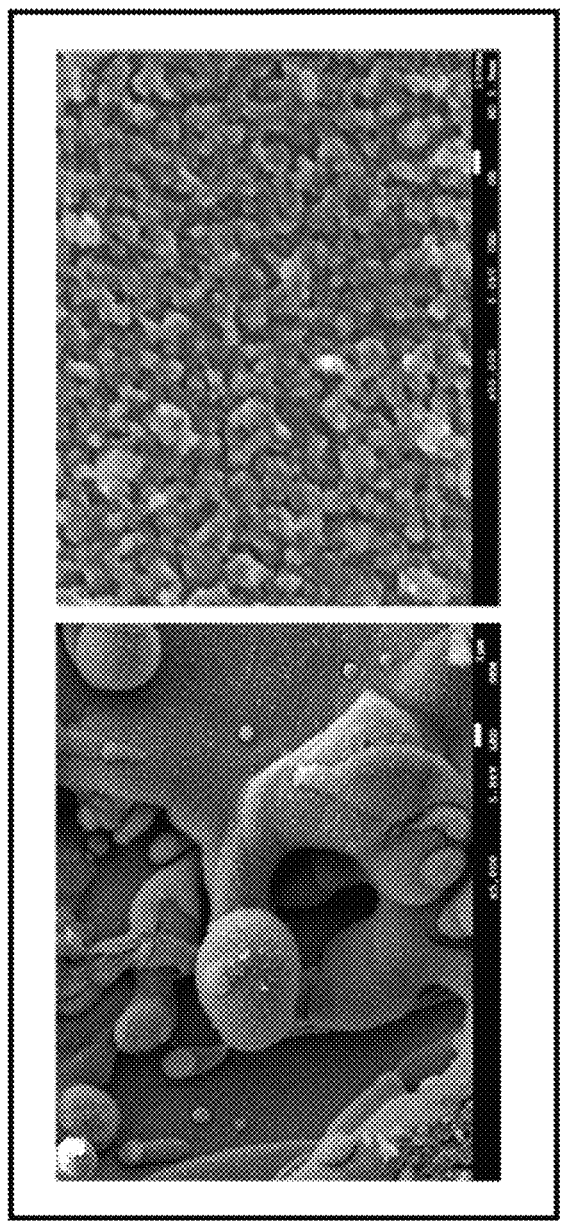
FIG. 4 is an SEM observation image of the surface modification region formed on the surface of the stainless steel material.

FIG. 4 shows SEM photographs (low magnification and high magnification) of the surface modification region formed on the surface of the stainless steel material. For the SEM observation, JSM-7100F available from JEOL Ltd. was used. From the high-magnification SEM photograph, it can be seen that clusters formed by continuously bonding particles having a particle size of about 5 to 100 nm are formed in the surface modification region. Further, as a result of performing SEM-EDS analysis on the cluster by using an energy dispersive X-ray analyzer (JED-2300 Analysis Station Plus) attached to the SEM, metal elements such as O and Fe were mainly detected. Specifically, the point analysis results for the clusters were Fe: 28.0 at %, O: 26.2 at %, Cr: 21.9 at %, C: 17.2 at %, Ni: 4.8 at %, Mn: 1.5 at % and Si: 0.4 at %. These results indicate that the cluster where the fine metal oxide particles were bonded continuously was formed in the surface modification region.

Figure 5:
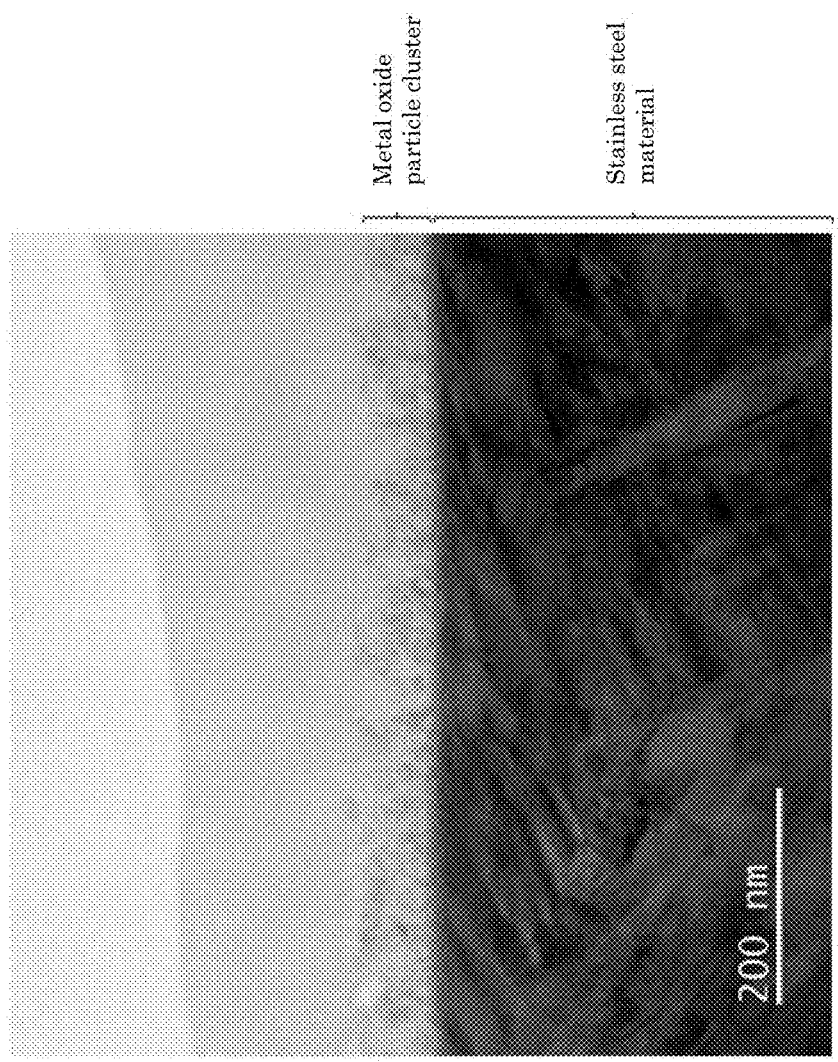
FIG. 5 is a TEM observation image of the cross section of the surface modification region.

TEM observation was performed on the cross section of the surface modification region. JEM-ARM200F available from JEOL Ltd. was used for the TEM observation. The obtained TEM observation image is shown in FIG. 5. It can be seen that the surface of the cluster composed of the metal oxide particles is in a relatively smooth state, and the maximum height (Sz) is 50 nm to 3 µm.

Figure 6:
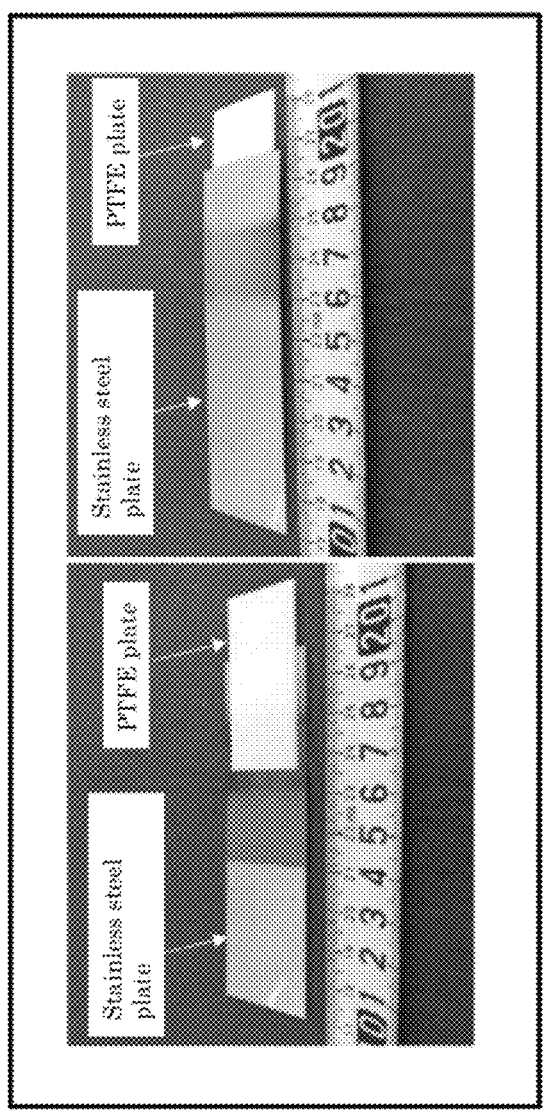
FIG. 6 is an appearance photograph of the metal-fluororesin bonded body obtained in Example.

After the first step, the PTFE plate was superposed on the surface modification region (second step), and the laser was irradiated from the stainless steel plate side to obtain a metal-fluororesin bonded body (third step). In the third step, a 4 kW semiconductor laser available from Laserline Corporation was used, and a zoom homogenizer was used for the optical system to obtain a 3 mm×40 mm line laser, and the line laser was scanned at an output of 200 w and a scanning speed of 0.5 mm/s for 25 mm. Further, in the third step, a pressure of about 5 MPa was applied to the interface to be bonded. The bonded portion of the metal-fluororesin bonded body has a bonding length of 15 mm with respect to a plate width of 25 mm, and a bonded region of 25 mm×15 mm is formed. An appearance photograph of the obtained metal-fluororesin bonded body is shown in FIG. 6.

Figure 7:
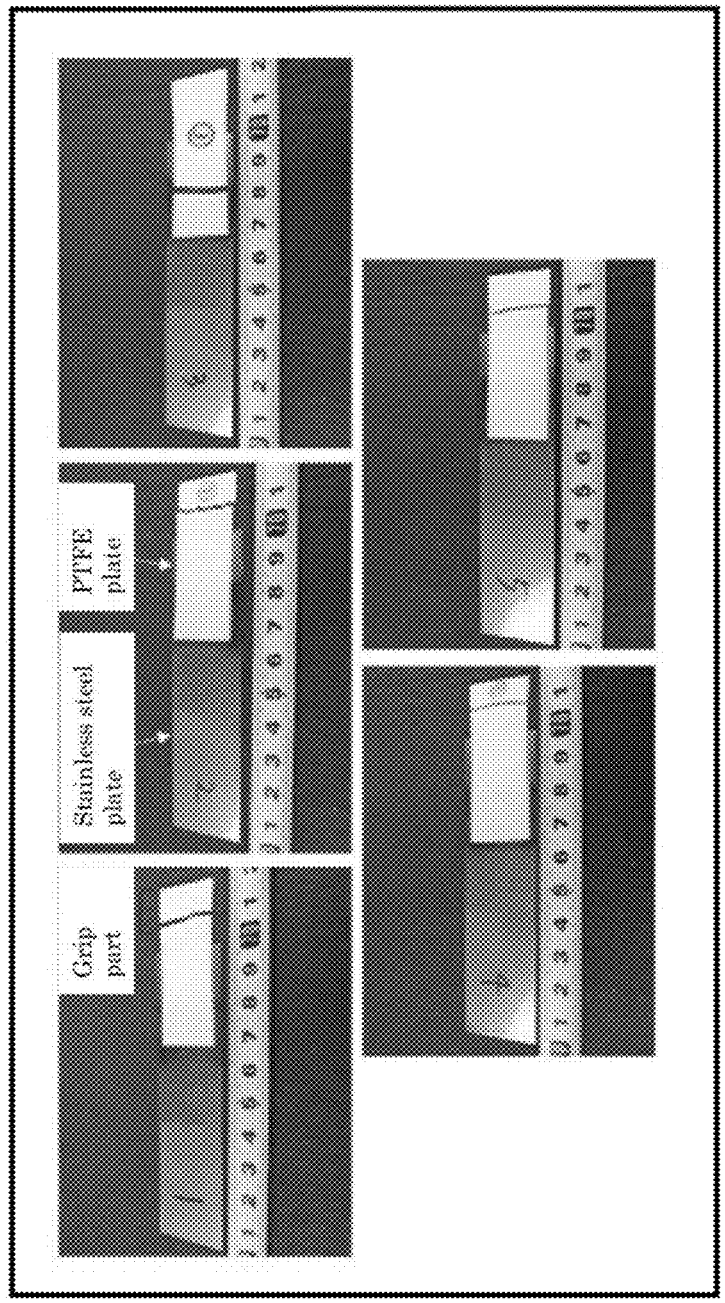
FIG. 7 is an appearance photograph of the metal-fluororesin bonded body after the shear tensile test.

Five metal-fluororesin bonded bodies were prepared by the same method, and the shear tensile strengths of the obtained bonded bodies were measured. Prior to the shear tensile test, the metal-fluororesin bonded body was held at −30° C. for 10 minutes, and the tensile speed was set to 10 mm/min. The obtained shear tensile properties are shown in Table 1. Further, FIG. 7 shows appearance photographs of the metal-fluororesin bonded bodies after the shear tensile test.

TABLE 1

| | Displacement to breakage (mm) | Maximum load (N) | Broken point |
| --- | --- | --- | --- |
| Bonded Body 1 | 11.6 | 638 | PTFE |
| Bonded Body 2 | 8.1 | 571 | PTFE |
| Bonded Body 3 | 12.0 | 605 | PTFE |
| Bonded Body 4 | 10.8 | 626 | PTFE |
| Bonded Body 5 | 8.6 | 618 | PTFE |

The PTFE plate was elongated in all the metal-fluororesin bonded bodies, and the load showed a high value of 500 N or more. The PTFE plate was broken in the shear tensile test, which shows that the bonding strength exceeding the material strength was obtained.

Figure 8:
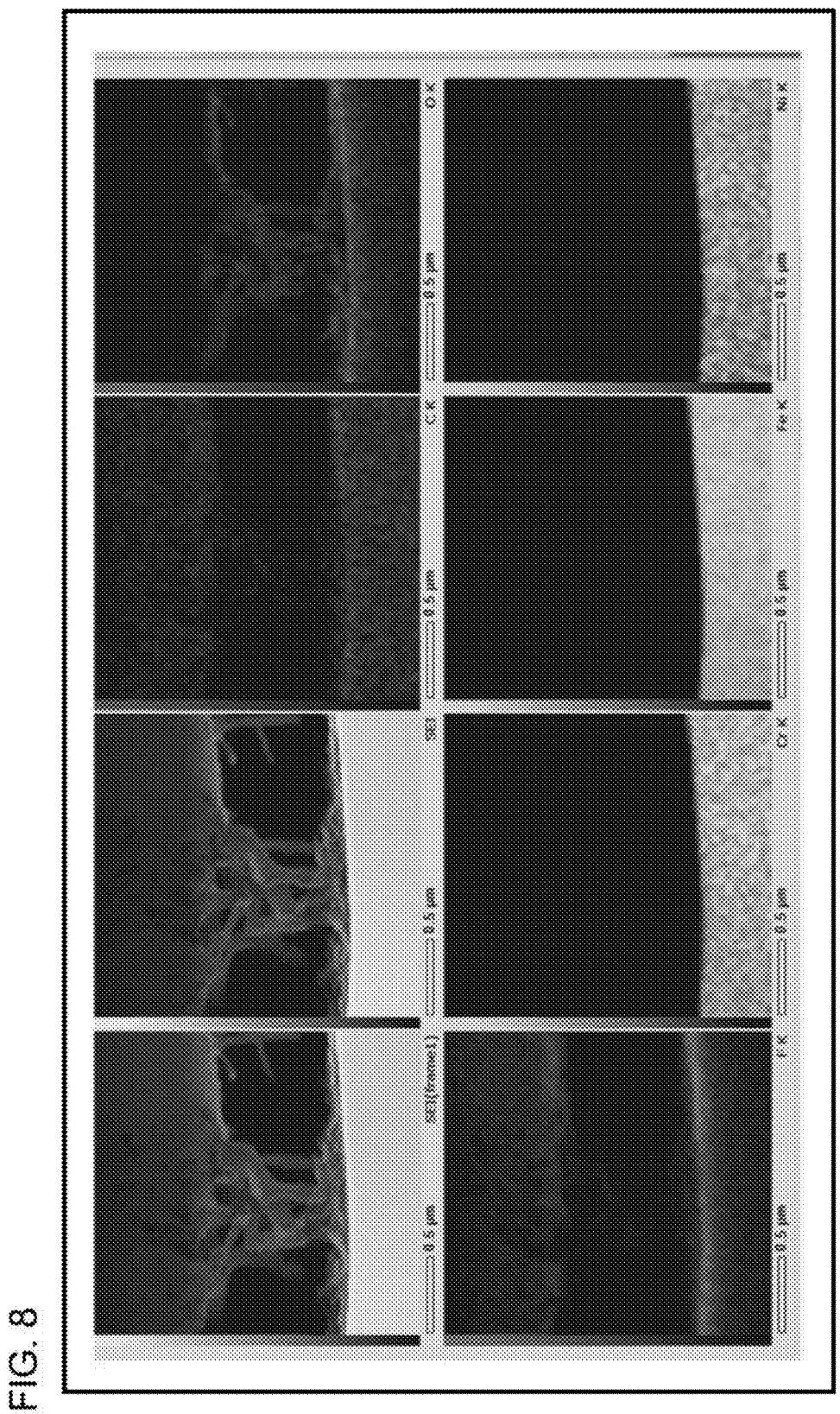
FIG. 8 is the result of STEM-EDS analysis of the peeled region of the metal-fluororesin bonded body.

Further, as to the metal-fluororesin bonded body, the stainless steel plate and the PTFE plate were forcibly peeled off, and the sample immediately before the complete separation was analyzed by the STEM-EDS. The obtained STEM-EDS analysis result is shown in FIG. 8. The PTFE is elongated in a fibrous form while being bonded to the metal oxide particle cluster, and voids are formed at the bonded interface. Further, in the EDS analysis, C and O were clearly detected, but F was hardly detected. The result suggests that the C—F bond of the PTFE is changed to the bond of C—O—O, C—O, C═O and the like.

2. Case that the Thermoplastic Resin is Other than the Fluororesin

Example 2

The metal material and the thermoplastic resin material were directly bonded by using the metal-thermoplastic resin direct bonding method of the present invention. The metal material was a stainless steel (SUS304) plate of 2 mm×25 mm×100 mm, and the thermoplastic resin material was a polypropylene (PP) plate of 2 mm×30 mm×100 mm.

A surface modification region was formed in the region (25 mm×15 mm) which is to be the interface to be bonded of the stainless steel material in the same manner as in Example 1 (first step).

After the first step, the polypropylene plate was superposed on the surface modification region (second step), and the laser was irradiated from the stainless steel plate side to obtain a metal-thermoplastic resin bonded body (third step). In the third step, a 4 kW semiconductor laser available from Laserline Corporation was used, and a zoom homogenizer was used for the optical system to obtain a 5 mm×25 mm line laser. Further, in order to make the bonding temperature constant, temperature feedback control where the laser output is variable was employed. The laser scanning speed was 1 mm/s, and the laser scanning distance was 15 mm.

Further, in the third step, a quartz glass rod was installed on the stainless steel plate for pressurizing the laser irradiation portion, and the laser irradiation was performed in a state of being pressurized from the lower side of the polypropylene plate.

(1) Influence of Bonding Temperature to Bonding Strength

Figure 9:
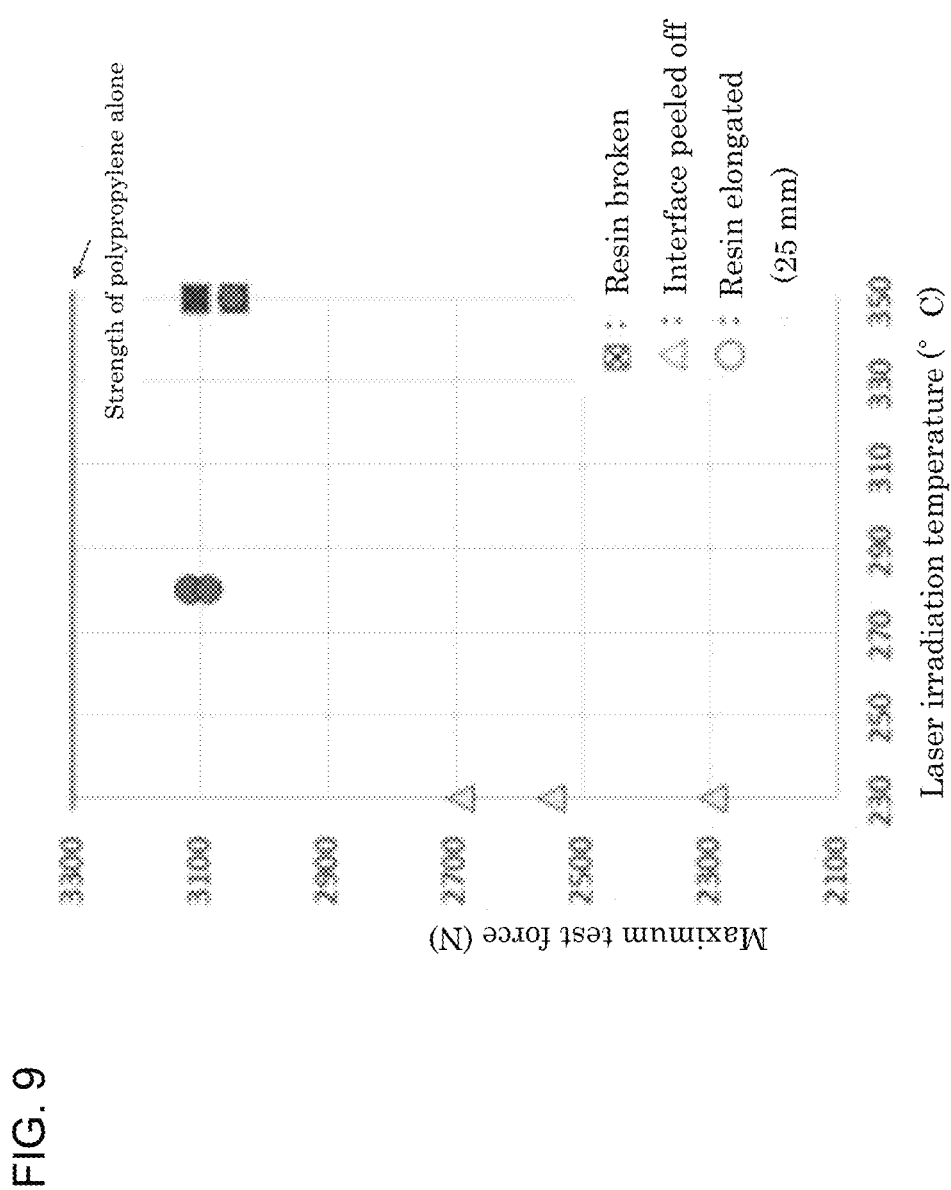
FIG. 9 is a graph which shows the relationship between the laser irradiation set temperature and the shear tensile strength.

The pressure applied to the bonded portion in the third step was 0.29 MPa, and the laser irradiation set temperatures were 230° C., 280° C. and 350° C. to obtain bonded bodies. Here, the material to be bonded was restrained with a jig so that the position did not change, and the jig was removed after the temperature of the bonded portion became about room temperature. Each of the obtained bonded bodies was subjected to the shear tensile test to evaluate the strength of the bonded portion. A precision universal testing machine autograph (AGX-50KNVD) available from Shimadzu Corporation was used for the shear tensile test. The obtained results are shown in FIG. 9.

When the laser irradiation set temperature was set to 230° C., all the bonded bodies were broken due to peeling from the bonded interface, and it is considered that sufficient bonding strength could not be obtained due to insufficient heat input. On the other hand, when the laser irradiation set temperature was set to 280° C., the polypropylene was elongated in the bonded bodies and the bonded bodies were not broken from the bonded interface or the polypropylene material (measurement was terminated when the polypropylene was elongated by 25 mm). Further, when the laser irradiation set temperature was set to 350° C., although no breakage was observed from the bonded interface, but breakage occurred after the polypropylene was elongated. It is considered that the breakage of the polypropylene is caused by the deterioration of the polypropylene due to excessive heat input by the laser irradiation.

Figure 10:
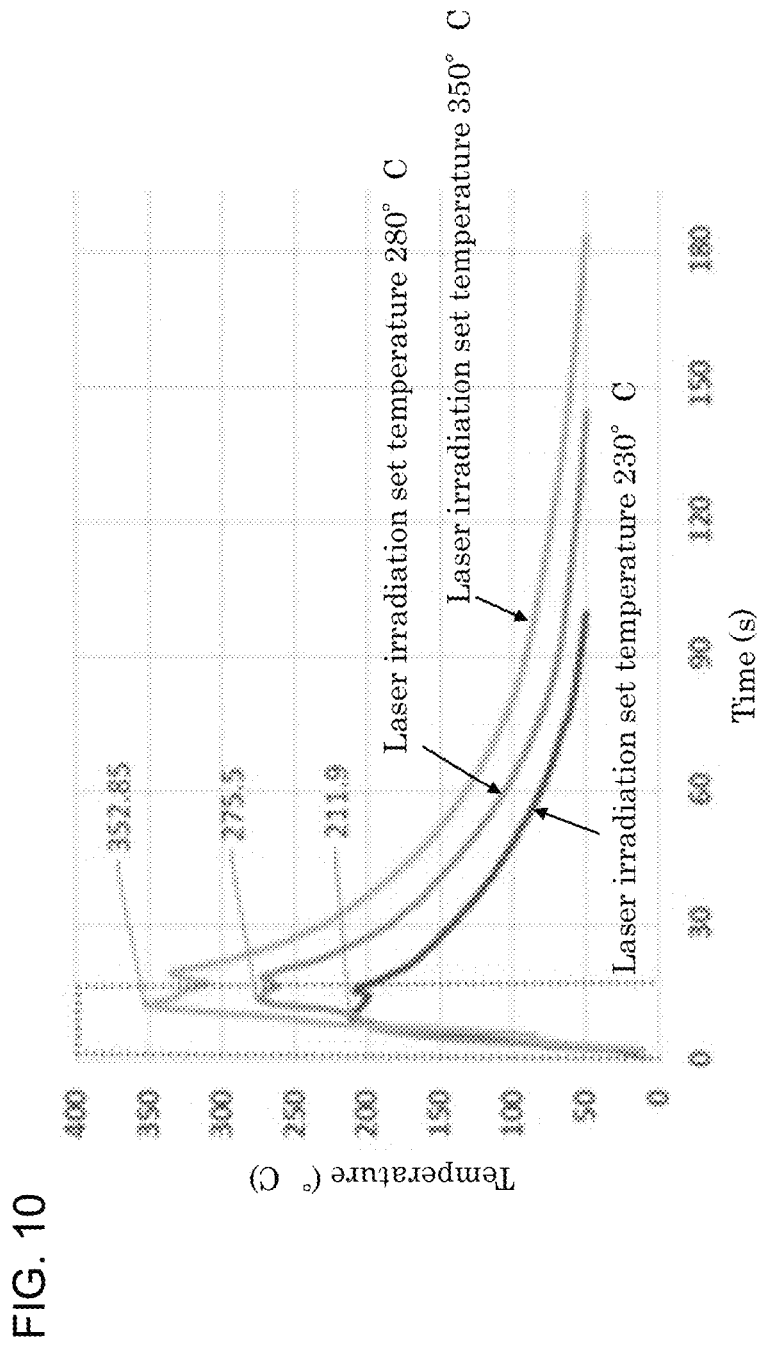
FIG. 10 is a graph which shows the relationship between the laser irradiation set temperature and the maximum reached temperature.

In order to verify the accuracy of the control of the bonding temperature by the laser irradiation set temperature, the temperature measurement of the bonded interface in the third step was performed. Specifically, a K-type thermocouple was attached to the center of the bonded interface on the stainless steel material side, and the results of the temperature measurement were recorded by using a data logger (NR600) available from KEYENCE. The obtained results are shown in FIG. 10. The laser irradiation set temperatures and the measured bonding temperature (maximum reached temperature) corresponded well, and thus it was confirmed that the laser irradiation set temperature is regarded as the bonding temperature.

(2) Influence of Bonding Pressure to Bonding Strength

Figure 11:
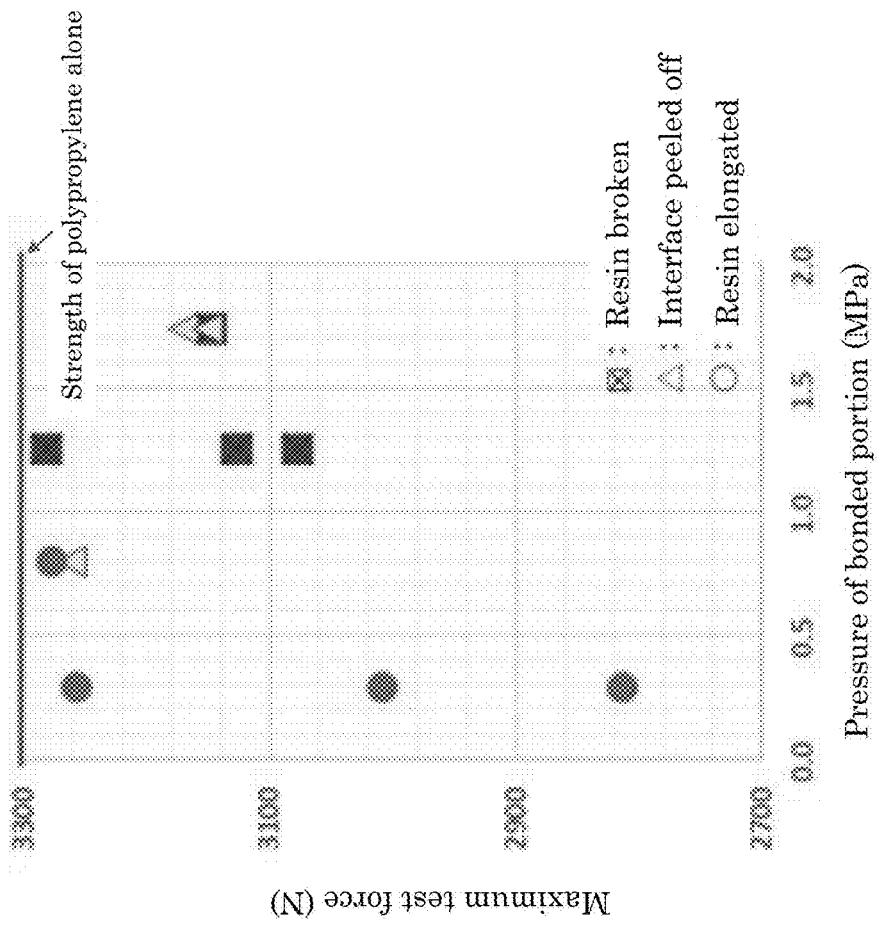
FIG. 11 is a graph which shows the relationship between the bonding pressure and the shear tensile strength.

In the third step, the laser irradiation set temperature was 280° C., and the pressures applied to the bonded portion was 0.29 MPa, 0.80 MPa, 1.25 MPa and 1.74 MPa to obtain bonded bodies. The pressure applied to the bonded portion was measured by arranging a heat-resistant pressure-sensitive sheet available from Nitta at the interface to be bonded. Here, the material to be bonded was restrained with a jig so that the position did not change, and the jig was removed after the temperature of the bonded portion became about room temperature. Each of the obtained bonded bodies was subjected to the shear tensile test to evaluate the strength of the bonded portion. A precision universal testing machine autograph (AGX-50KNVD) available from Shimadzu Corporation was used for the shear tensile test. The measurement was terminated when the polypropylene was elongated by 25 mm. The obtained results are shown in Table 2 and FIG. 11.

TABLE 2

| Bonding pressure | Shear tensile test results | |
|---|---|---|
| (MPa) | Maximum test force (N) | State of test piece |
| 0.29 | 2813 | Resin elongated (25 mm) |
| 0.29 | 3008 | Resin elongated (25 mm) |
| 0.29 | 3257 | Resin elongated (25 mm) |
| 0.80 | 3261 | Bonded interface peeled off |
| 0.80 | 3368 | Bonded interface peeled off |
| 0.80 | 3277 | Resin elongated (25 mm) |
| 1.25 | 3281 | Resin broken |
| 1.25 | 3126 | Resin broken |
| 1.25 | 3077 | Resin broken |
| 1.74 | 3147 | Resin broken |
| 1.74 | 3170 | Bonded interface peeled off |
| 1.74 | 3149 | Bonded interface peeled off |

When the applied pressure to the bonded portion was 0.80 MPa or more, in the shear tensile test, the polypropylene or the bonded interface was broken, and sufficient elongation of polypropylene was not observed. It is considered that when heating under the condition where a certain or more pressure is applied to the bonded interface, the shape change of the resin occurs due to the expansion and contraction, which promotes the breakage at the interface between the skin layer and the bulk layer of the resin.

(3) Influence of Bonding Restraint Time to Bonding Strength

The laser irradiation set temperature was 280° C., and the pressure applied to the bonded portion was 0.29 MPa to obtain bonded bodies. Here, the material to be bonded was restrained with a jig so that the position did not change, and the jig was removed 0 to 60 seconds after the completion of the third step. Each of the obtained bonded bodies was subjected to the shear tensile test to evaluate the strength of the bonded portion. A precision universal testing machine autograph (AGX-50KNVD) available from Shimadzu Corporation was used for the shear tensile test. The measurement was terminated when the polypropylene was elongated by 25 mm. The obtained results are shown in Table 3.

TABLE 3

| Lapse time after completion of laser irradiation | Shear tensile test results | |
|---|---|---|
| (second) | Maximum test force (N) | State of test piece |
| 0 | 1927 | Bonded interface peeled off |
| 0 | 2748 | Bonded interface peeled off |
| 0 | 2708 | Bonded interface peeled off |
| 30 | 2885 | Bonded interface peeled off |
| 30 | 3108 | Resin elongated (25 mm) |
| 30 | 3108 | Resin elongated (25 mm) |
| 60 | 2813 | Resin elongated (25 mm) |
| 60 | 3008 | Resin elongated (25 mm) |
| 60 | 3257 | Resin elongated (25 mm) |

When the restraint state is released immediately after the laser irradiation, the breakage occurs from the bonded interface, and the value of the maximum test force is also small. On the other hand, as the time until the jig is removed is extended, the state of the breakage becomes better, and when the jig is removed after 60 seconds, sufficient polypropylene elongation is observed in all the bonded bodies, and the value of the maximum test force is also large.

Figure 12:
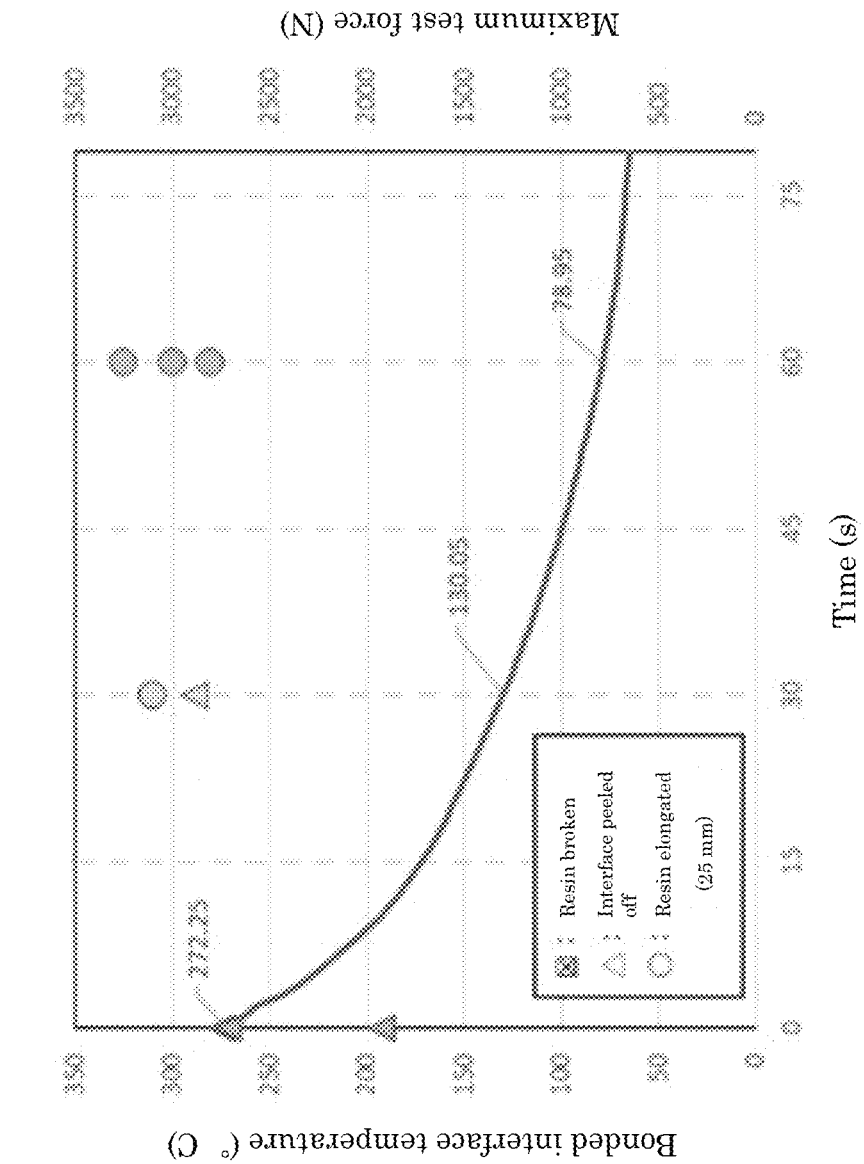
FIG. 12 is a graph which shows the relationship between the bonded interface temperature and the shear tensile strength.

FIG. 12 shows the relationship between the bonded interface temperature after the laser irradiation measured by the K-type thermocouple arranged at the center of the bonded interface on the stainless steel material side and the maximum test force in the shear tensile test. The bonded interface temperature immediately after laser irradiation is 272° C., the bonded interface temperature after 30 seconds is 130° C., and the bonded interface temperature after 60 seconds is 78° C. From the results, it can be seen that a good bonded portion can be obtained by releasing the restraint state after lowering the bonded interface temperature.

Example 3

By using the metal-thermoplastic resin direct bonding method of the present invention, various metal materials and various thermoplastic resin materials were directly bonded. Table 4 shows the kinds of the materials to be bonded and the bonding conditions. Further, a shear tensile test was performed on each of the obtained bonded bodies to evaluate the strength of the bonded portions. A precision universal testing machine autograph (AGX-50KNVD) available from Shimadzu Corporation was used for the shear tensile test. The measurement was terminated when the resin material was elongated by 25 mm. The obtained results are shown in Table 4.

Here, the long carbon fiber reinforced polyamide 6 is TLP1040 available from Toray Industries, Inc., PET is EMC-500 available from Toyobo Co., Ltd., the glass fiber reinforced PET is EMC-330 available from Toyobo Co., Ltd., and the impact-resistant nylon is Nanoarray available from Toray Industries, Inc. The conditions not shown in Table 4, such as the size of the material to be bonded, are the same as in Example 2.

From Table 4, it can be seen that, by using the metal-thermoplastic resin direct bonding method of the present invention, various combinations of metal materials and thermoplastic resin materials can be directly bonded, and the obtained bonded portion has high strength.

Comparative Example

Direct bonding between various metal materials and various thermoplastic resin materials by using the same bonding conditions as the metal-thermoplastic resin direct bonding method of the present invention was achieved, except that the surface modification region was not formed on the metal plate. Table 5 shows the kinds of the materials to be bonded and the bonding conditions. The specific kinds of the thermoplastic resin material are the same as in the example, and the conditions not shown in Table 5 such as the size of the material to be bonded are also the same as in the example. Further, a shear tensile test was performed on each of the obtained bonded bodies to evaluate the strength of the bonded portions. The obtained results are shown in Table 5.

TABLE 4

| Metal material | Thermoplastic resin material | Surface modification pattern (First step) | Bonding conditions (Third step) | | | | Shear tensile test results | |
|---|---|---|---|---|---|---|---|---|
| | | | Irradiation set temp. (° C.) | Beam size (mm$^2$) | Scanning speed (mm/s) | Applied pressure (MPa) | Maximum test force. (N) | State of test piece |
| SUS409 | Polypropylene | 30 × 70 μm | 230 | 5 × 25 | 1 | — | 1609 | Resin elongated (25 mm) |
| SUS409 | Polypropylene | 30 × 70 μm | 280 | 5 × 25 | 1 | — | 1667 | Resin elongated (25 mm) |
| SUS409 | Maleic acid anhydride modified polypropylene | 30 × 70 μm | 210 | 5 × 25 | 1 | — | 1475 | Rezin broken |
| SUS409 | Long carbon fiber reinforced polyamide 6 | 30 × 70 μm | 230 | 5 × 25 | 1 | — | 5789 | Resin broken |
| SUS409 | Polycarbonate | 30 × 70 μm | 230 | 5 × 25 | 1 | — | 3121 | Resin broken |
| SUS409 | PET | 30 × 70 μm | 230 | 5 × 25 | 1 | — | 2417 | Resin broken |
| SUS409 | Glass fiber reinforced PET | 30 × 70 μm | 230 | 5 × 25 | 1 | — | 4353 | Resin broken |
| SUS409 | Impact-resistant nylon | 30 × 70 μm | 250 | 5 × 25 | 1 | — | 1012 | Rezin broken |
| A5052 | Polypropylene | 30 × 70 μm | 270 | 5 × 25 | 1 | — | 1758 | Resin elongated (25 mm) |
| A5052 | Polypropylene | 30 × 70 μm | 280 | 5 × 25 | 1 | — | 1874 | Resin broken |
| A5052 | Polyacetal | 30 × 70 μm | 280 | 5 × 25 | 1 | — | 2979 | Resin broken |
| A6061 | Polypropylene | 30 × 70 μm | 280 | 5 × 25 | 1 | — | 1659 | Resin elongated (25 mm) |
| Galvanized steel sheet | Polypropylene | 30 × 70 μm | 230 | 5 × 25 | 1 | — | 1741 | Resin elongated (25 mm) |

TABLE 5

| Metal material | Thermoplastic resin material | Surface modification pattern (First step) | Irradiation set temp. (° C.) | Beam size (mm²) | Scanning speed (mm/s) | Applied pressure (MPa) | Maximum test force (N) | State of test piece |
|---|---|---|---|---|---|---|---|---|
| SUS409 | Polypropylene | — | 230 | 5 × 25 | 1 | — | — | Not bonded, so cannot be tested |
| SUS409 | Maleic acid anhydride modified polypropylene | — | 210 | 5 × 25 | 1 | — | — | Not bonded, so cannot be tested |
| SUS409 | Long carbon fiber reinforced polyamide 6 | — | 230 | 5 × 25 | 1 | — | 3308 | Bonded interface peeled off |
| SUS409 | Polycarbonate | — | 230 | 5 × 25 | 1 | — | — | Not bonded. so cannot be tested |
| SUS409 | PET | — | 230 | 5 × 25 | 1 | — | — | Not bonded, so cannot be tested |
| SUS409 | Glass fiber reinforced PET | — | 230 | 5 × 25 | 1 | — | — | Not bonded, so cannot be tested |
| SUS409 | Impact-resistant nylon | — | 250 | 5 × 25 | 1 | — | — | Not bonded. so cannot be tested |
| A5052 | Polypropylene | — | 280 | 5 × 25 | 1 | — | — | Not bonded, so cannot be tested |
| A5052 | Polyacetal | — | 280 | 5 × 25 | 1 | — | — | Not bonded, so cannot be tested |
| A6061 | Polypropylene | — | 280 | 5 × 25 | 1 | — | — | Not bonded, so cannot be tested |
| Galvanized steel sheet | Polypropylene | — | 230 | 5 × 25 | 1 | — | — | Not bonded. so cannot be tested |

From Table 5, it can be seen that, even when the same bonding conditions as the metal-thermoplastic resin direct bonding method of the present invention are used, if the surface modification region is not formed on the metal plate, it is not possible to obtain the bonded portion having sufficient high strength where the resin material is sufficiently elongated in the shear tensile test.

EXPLANATION OF SYMBOLS

2 . . . Metal-fluororesin bonded body,
4 . . . Fluororesin material,
6 . . . Metal material,
8 . . . Bonded portion.
12 . . . Metal-thermoplastic resin bonded body,
14 . . . Thermoplastic resin material.

The invention claimed is:

1. A metal-thermoplastic resin direct bonding method where a metal material and a thermoplastic resin material are directly bonded, which includes:
   a first step for irradiating a surface of the metal material with a pulse laser under an oxidizing atmosphere to form a surface modification region,
   a second step for abutting the thermoplastic resin material against the surface modification region to form an interface to be bonded, and
   a third step for heating up the interface to be bonded by laser irradiation to achieve bonding,
   wherein, in the first step, a metal oxide particle cluster in which metal oxide particles having a particle size of 5 to 500 nm are continuously bonded is formed in the surface modification region, and
   the maximum height (Sz) of the surface of the metal oxide particle cluster is 50 nm to 3 μm.

2. The metal-thermoplastic resin direct bonding method according to claim 1, wherein the thermoplastic resin material is a fluororesin material.

3. The metal-thermoplastic resin direct bonding method according to claim 2, wherein, in the third step, a C—F bond of the fluororesin material is cleaved by catalytic action of the metal oxide particles to bond a functional group which is yielded by the cleavage with a metal element contained in the metal material.

4. The metal-thermoplastic resin direct bonding method according to claim 2, wherein, in the third step, a pressure of 5 MPa or more is applied to the interface to be bonded.

5. The metal-thermoplastic resin direct bonding method according to any claim 1, wherein the thermoplastic resin material is any one of a general-purpose plastic, an engineering plastic, and a super engineering plastic.

6. The metal-thermoplastic resin direct bonding method according to claim 5, wherein a temperature (T) of the interface to be bonded in the third step satisfies the following relational Equation (1):

the melting point (° C.) of the thermoplastic resin material≤T≤the thermal decomposition temperature of the thermoplastic resin material   (1)

7. The metal-thermoplastic resin direct bonding method according to claim 5, wherein, in the third step, a pressure of more than 0 to 0.8 MPa or less is applied to the interface to be bonded.

8. The metal-thermoplastic resin direct bonding method according to claim 1, wherein the particle size of the metal oxide particles is 50 to 200 nm.

9. The metal-thermoplastic resin direct bonding method according to claim 1, wherein an area of the surface modification region is 20% or more of the interface to be bonded.

10. The metal-thermoplastic resin direct bonding method according to claim 1, wherein the irradiation energy of one pulse of the pulse laser is 0.2 to 1.0 mj.

11. The metal-thermoplastic resin direct bonding method according to claim 1, wherein when the thermoplastic resin material is transparent, the pulse laser is irradiated from the thermoplastic resin material side, and when the thermoplastic resin material is opaque, the pulse laser is irradiated from the metal material side.

12. The metal-thermoplastic resin direct bonding method according to claim 1, wherein the metal material is any one of a steel material, an aluminum material, an aluminum alloy material, a titanium material, a titanium alloy material, a nickel-titanium alloy material, a copper material and a copper alloy material.

13. The metal-thermoplastic resin direct bonding method according to claim 1, wherein the third step is achieved in a state where the metal material and the interface to be bonded of the thermoplastic resin material are in close contact with each other, and after the third step, the close contact state is maintained until the temperature of the bonded interface becomes 80% or less of the melting point (° C.) of the thermoplastic resin material.

14. The metal-thermoplastic resin direct bonding method according to claim 1, wherein, in the third step, at least one of C—H bond, C—C bond, C=C A bond and C—N bond of the thermoplastic resin material is cleaved by catalytic action of the metal oxide particles.

* * * * *